US007310110B2

(12) United States Patent
Grindstaff et al.

(10) Patent No.: US 7,310,110 B2
(45) Date of Patent: Dec. 18, 2007

(54) METHOD, DEVICE AND COMPUTER PROGRAM PRODUCT FOR DEMULTIPLEXING OF VIDEO IMAGES

(75) Inventors: Gene Arthur Grindstaff, Decatur, AL (US); Susan Heath Calvin Fletcher, Huntsville, AL (US); Therman Ward McKay, III, Huntsville, AL (US)

(73) Assignee: Intergraph Software Technologies Company, Las Vegas, NV (US)

( * ) Notice: Subject to any disclaimer, the term of this patent is extended or adjusted under 35 U.S.C. 154(b) by 803 days.

(21) Appl. No.: 10/237,251

(22) Filed: Sep. 6, 2002

(65) Prior Publication Data

US 2003/0048947 A1 Mar. 13, 2003

Related U.S. Application Data

(60) Provisional application No. 60/318,164, filed on Sep. 7, 2001.

(51) Int. Cl.
*H04N 7/18* (2006.01)

(52) U.S. Cl. .................................................. 348/143

(58) Field of Classification Search ........ 348/143–159, 348/160, 170; 382/233, 104; 709/204; 352/129; 725/39; 375/240.01; 704/264; *H04N 7/18*
See application file for complete search history.

(56) References Cited

U.S. PATENT DOCUMENTS 3,652,790 A 3/1972 Eberhardt ................... 178/6.8

(Continued)

FOREIGN PATENT DOCUMENTS

DE 38 41 387 A1 6/1989

(Continued)

OTHER PUBLICATIONS

Zhang, et al. "Automatic Partitioning of Full-Motion Video," *Institute of Systems Science*, Received Jan. 10, 1993/Accepted Apr. 10, 1993, pp. 10-28.

(Continued)

*Primary Examiner*—Tung Vo
(74) *Attorney, Agent, or Firm*—Bromberg & Sunstein LLP

(57) ABSTRACT

A method for demultiplexing digital video data which originates from multiple sources in which the multiplexed images are not indexed nor is there identification information provided to differentiate sources. The sources are generally cameras which may be stationary cameras or moving cameras that rotate as are commonly used in the surveillance industry. A first set of digital video data representative of a first image is retrieved from a memory source or from a video tape. The first set of digital video data is stored to a memory location associated with a first source. The first set of video data is also identified as representative video data of the first source. A second set of digital video data representative of a current image is then retrieved. A difference ratio is calculated using the representative digital video data and the current set of digital video data. If the difference ratio is above a threshold, a display query requiring response for classifying the current digital video data as belonging to an identified source or originating from a new source is presented to a user of the system. If a response is received indicating that the current set of digital video data is associated with a new source, the current set of digital video data is stored to a second memory location associated with the second source. This current set of digital video data is then identified as the representative video data for the second source.

54 Claims, 6 Drawing Sheets

U.S. PATENT DOCUMENTS

| | | | |
|---|---|---|---|
| 3,891,798 A | 6/1975 | Marcus | 178/6.8 |
| 3,953,669 A | 4/1976 | Saccomani et al. | 178/6.8 |
| 3,988,533 A | 10/1976 | Mick et al. | 178/6.8 |
| 4,120,004 A | 10/1978 | Coutta | 358/108 |
| 4,268,863 A | 5/1981 | Los | 358/160 |
| 4,405,940 A | 9/1983 | Woolfson et al. | 358/93 |
| 4,673,974 A * | 6/1987 | Ito et al. | 348/159 |
| 4,943,854 A | 7/1990 | Shiota et al. | 358/108 |
| 4,951,137 A | 8/1990 | Kisou et al. | 358/125 |
| 5,083,860 A * | 1/1992 | Miyatake et al. | 352/129 |
| 5,091,781 A | 2/1992 | An | 358/125 |
| 5,164,827 A | 11/1992 | Paff | 358/108 |
| 5,175,694 A | 12/1992 | Amato | 364/516 |
| 5,182,776 A | 1/1993 | Suzuki et al. | 382/14 |
| 5,243,418 A | 9/1993 | Kuno et al. | 358/108 |
| 5,915,038 A * | 6/1999 | Abdel-Mottaleb et al. | 382/209 |
| 5,973,723 A * | 10/1999 | DeLuca | 725/34 |
| 6,151,336 A * | 11/2000 | Cheng et al. | 370/535 |
| 6,182,116 B1 * | 1/2001 | Namma et al. | 709/204 |
| 6,259,817 B1 | 7/2001 | Ahmad | 382/236 |
| 6,363,380 B1 | 3/2002 | Dimitrova | 707/6 |
| 6,396,533 B1 | 5/2002 | Hudson | 348/154 |
| 6,405,371 B1 * | 6/2002 | Oosterhout et al. | 725/39 |
| 6,469,746 B1 * | 10/2002 | Maida | 348/564 |
| 6,476,858 B1 | 11/2002 | Ramirez Diaz et al. | 348/159 |
| 6,525,658 B2 * | 2/2003 | Streetman et al. | 340/522 |
| 6,636,640 B2 * | 10/2003 | Kondo | 382/233 |
| 6,694,064 B1 * | 2/2004 | Benkelman | 382/284 |
| 6,714,909 B1 * | 3/2004 | Gibbon et al. | 704/246 |
| 6,741,656 B1 * | 5/2004 | Tanaka | 375/240.26 |
| 6,744,908 B2 * | 6/2004 | Chujoh et al. | 382/104 |
| 6,795,112 B1 * | 9/2004 | Radice | 348/159 |
| 2002/0168181 A1 | 11/2002 | Hsiao et al. | 386/124 |
| 2005/0007452 A1 * | 1/2005 | McKay et al. | 348/143 |

FOREIGN PATENT DOCUMENTS

| | | |
|---|---|---|
| DE | 44 17 128 A1 | 12/1995 |
| DE | 201 04 329 U1 | 5/2001 |
| EP | 0 028 933 | 5/1981 |
| EP | 0 671 706 B1 | 9/1995 |
| EP | 0 690 413 A2 | 1/1996 |
| EP | 0 719 048 A2 | 6/1996 |
| EP | 0 729 036 B1 | 8/1996 |
| EP | 0 823 821 A2 | 2/1998 |
| EP | 0 833 503 A2 | 4/1998 |
| EP | 1 081 960 A1 | 3/2001 |
| EP | 1 316 933 A2 | 6/2003 |
| GB | 2 321 358 A | 7/1998 |
| JP | 08241414 | 9/1996 |
| WO | WO 94/17636 | 8/1994 |
| WO | WO 00/56074 | 9/2000 |
| WO | WO 02/07164 | 1/2002 |
| WO | WO 02/07164 A2 | 1/2002 |
| WO | WO 02/07164 A3 | 1/2002 |
| WO | WO 03/024112 A1 | 3/2003 |
| WO | WO 2004/066609 A2 | 8/2004 |

OTHER PUBLICATIONS

International Search Report, dated Jan. 27, 2003; received Jan. 29, 2003.

\* cited by examiner

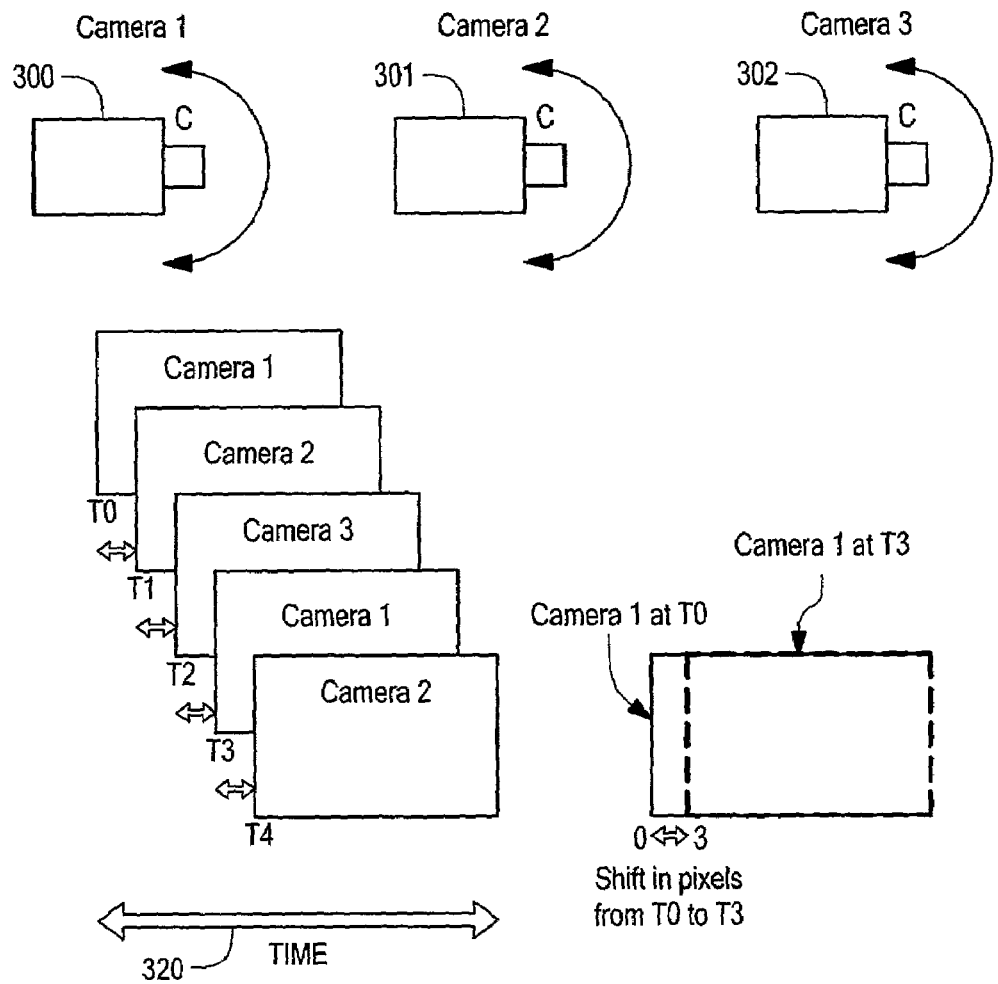
FIG. 3
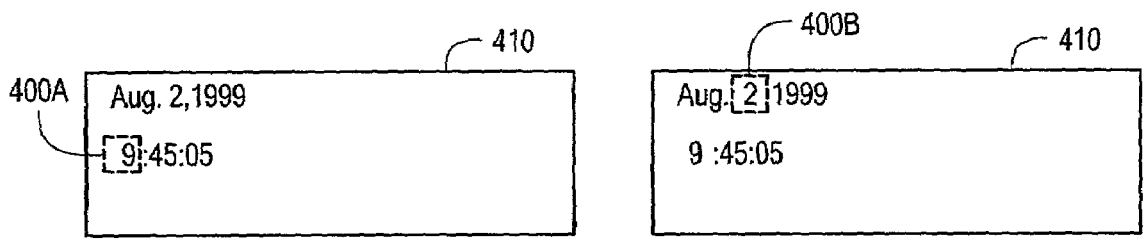
FIG. 4A  FIG. 4B

METHOD, DEVICE AND COMPUTER PROGRAM PRODUCT FOR DEMULTIPLEXING OF VIDEO IMAGES

PRIORITY

This application claims priority from U.S. Provisional Application No. 60/318,164, filed Sep. 7, 2001 entitled "Method, Device and Computer Program Product for Analysis of Video Images", the full disclosure of which is hereby incorporated by reference herein.

TECHNICAL FIELD

The present invention relates to analysis of video images. More specifically, the present invention relates to the demultiplexing of a non-indexed video image stream.

BACKGROUND

In the prior art, it is known to have the output of multiple surveillance cameras multiplexed together to produce a video signal which is a composite signal of all of the output signals from the cameras. Typically, the images are combined in a sequential fashion in which one or more frames for a given camera are added to the video sequence and the multiplexor then adds one or more frames from the next camera. The number of frames that are added per camera is dependent upon the timing signal for the multiplexor, the number of cameras and the filming rate. It is also known in the art to take a digital representation of the video signal and to identify the images that originated for each camera in the multiplexed video signal. However, in the prior art the process is performed serially in that images produced by a single camera are identified through comparison of the entire digital representation of the video signal. Explained in another way, in order to obtain the output signals for all of the number of cameras, N, N passes through the video signal must occur. Further, such systems only provide for direct comparisons of images. For example, once the first image is identified and associated with the first camera, a comparison is made to every other image in the video signal. If a change occurs within the view of the first camera during filming and the resultant data is significantly different from the first image, the system would drop the image since it does not match, even if the image should be associated with the camera. Thus, the prior art systems do not readily account for motion which occurs in front of a camera. Further, such systems are inadequate for cameras which pan in which the view as seen by the camera changes over time. Thus, it would be desirable to have a system which allowed for parallel processing of all cameras in one pass through the digital representation of the video signal. It is further desirable to have a method and system for accommodating panning cameras. Further it is desirable to have a system which does not drop frames during demultiplexing and allows for the identification of motion within the view of a camera.

SUMMARY OF THE INVENTION

One embodiment of the invention is a method for demultiplexing digital video data which originates from multiple sources in which the multiplexed images are not indexed nor is there identification information provided to differentiate sources. The sources are generally cameras which may be stationary cameras or moving cameras that rotate as are commonly used in the surveillance industry. A first set of digital video data representative of a first image is retrieved from a memory source or from a video tape. The first set of digital video data is stored to a memory location associated with a first source. The first set of video data is also identified as representative video data of the first source. A second set of digital video data representative of a current image is then retrieved. A difference ratio is calculated using the representative digital video data and the current set of digital video data. If the difference ratio is above a threshold, a display query requiring response for classifying the current digital video data as belonging to an identified source or originating from a new source is presented to a user of the system. If a response is received indicating that the current set of digital video data is associated with a new source, the current set of digital video data is stored to a second memory location associated with the second source. This current set of digital video data is then identified as the representative video data for the second source.

If the difference ratio is below the threshold, the current digital video data is stored to the memory location associated with the first source such that the current digital video data set now becomes the representative digital video data for the first source. In certain embodiments, the digital video data is normalized to compensate for differences in brightness prior to calculating a difference ratio. If there are multiple sources and the sources are identified and have associated representative frames, a difference ratio is calculated for each representative frame and each difference ratio is compared to the threshold. If a difference ratio associated with a representative frame of a source is below the threshold, the current frame of digital video data is made the new representative frame for that source.

In certain embodiments the digital video data that is stored as the representative frame is reduced in size prior to being stored. In such an embodiment, the current digital video data that represents the current frame of video is also reduced in size prior to calculating the difference ratio.

In other embodiments of the invention, a user may send a signal containing information representative of a section of the image. The data that resides within that section of the image is the data that is used for comparison and wherein the same section of the current frame and the same section of each representative frame are used in calculating the difference ratio.

The above defined methodology is such that all frames of data can be identified as coming from a source with a single pass through the data. The methodology as described may be embodied in a computer program product having computer code thereon which is computer readable.

The method may also be implemented in a device comprised of modules. The device may be part of a system that includes camera and a processor for receiving each video signal and multiplexing the signal into a multiplexed video signal. The system may further include memory for storing the multiplexed and demultiplexed video signal. In the system, the processor receives a demultiplexing request and the processor demultiplexes the multiplexed video signal in a single pass through the multiplexed video signal. The system may include a retrieval module for retrieving a first set of digital video data representative of a first image and retrieving a current set of digital video data representative of a current image. The system would further have a storage module, a calculation module and a query module. The calculation module calculates a difference ratio using the first set of digital video data and the current set of digital video data and the storage module stores the first set of digital video data to a memory location associated with a first source. The query module produces a display query requiring response for classifying the digital video data as belonging to an identified source or originating from a new source if the difference ratio is above a threshold.

The storage module also stores the current set of digital video data to a second memory location associated with the second source in accordance with a received response indicating that the current set of digital video data is associated with a new source. If the difference ratio is below the threshold, the storage module stores the current digital video data to the memory location associated with the first source. The system may also include a normalization module for normalizing the digital video data to compensate for differences in brightness prior to providing the digital video data to the calculation module for calculating a difference ratio. In the system, the calculation module calculates a difference ratio for each representative digital video data set representative of a source and the current set of digital video data and the query module compares each difference ratio to the threshold.

BRIEF DESCRIPTION OF THE DRAWINGS

The features of the invention will be more readily understood by reference to the following detailed description, taken with reference to the accompanying drawings, in which:

FIG. 3 shows three cameras (camera 1, camera 2, and camera 3) producing a sequence of multiplexed video frames in which an image from each camera is added to the sequence over time;

FIG. 4 shows a user selected region of interest in which the region contains a displayed date and time.

DETAILED DESCRIPTION OF SPECIFIC EMBODIMENTS

As used in the following text, the term "digital video" implies a digital representation of a sequence of images which may be temporally displayed on a display device. Typically, digital video contains a plurality of frames wherein each frame represents a separate image. The frames may be further subdivided such that the frames are made up of a series of pixels. As used in the following description the term "pixel" shall mean a single point of an image. The greater the number of pixels that are contained in an image, the greater the resolution of the video. Resolutions are conventionally referenced by length and width measurements of the number of pixels, for example, in a resolution of 800×600, there are 800 pixels along the length of an image by 600 pixels along the width of the image.

In an embodiment of the present invention, video images in a stream of images formed from a plurality of video sources are de-multiplexed so that the images from a given source can be collected, analyzed and viewed.

Figure 1:
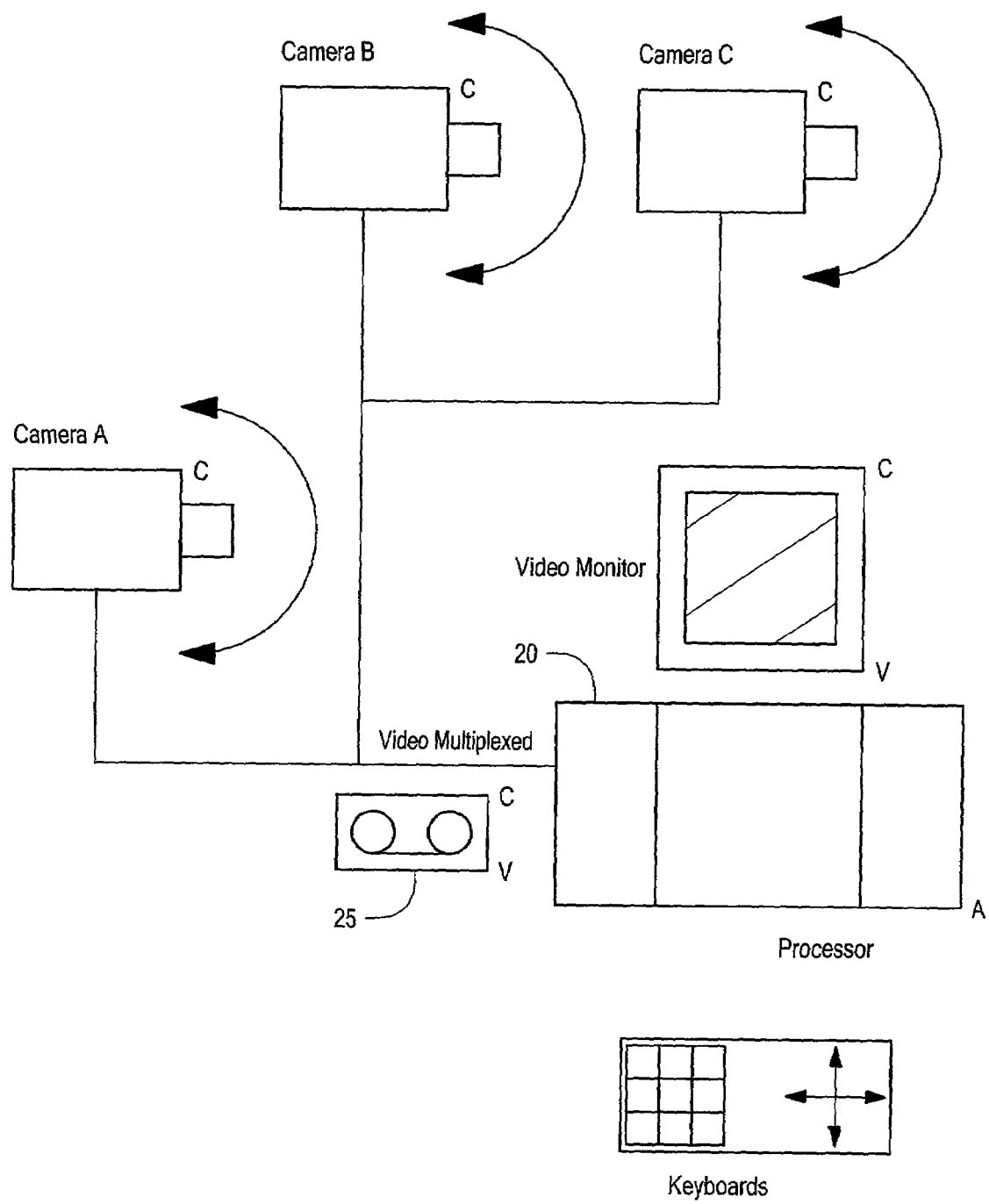
FIG. 1 shows one environment for implementing a first embodiment for demultiplexing video images.

FIG. 1 shows one environment for implementing an embodiment of the invention. In FIG. 1 a plurality of cameras (Camera A, Camera B, and Camera C) are shown. Each camera produces a video signal containing video information which is multiplexed together and stored either in a digital format in memory associated with a processor 20 or in digital or analog format on a tape 25. The multiplexed information does not contain header information to identify the source nor is their any index information provided to identify the source. The multiplexed information is subsequently de-multiplexed by the processor. If the video information is in an analog format, the information is first digitized in an analog to digital conversion process which is well known to those of ordinary skill in the art. After the video information is digitized, the sequence of digital data is transferred to a processor. The images may be compressed or uncompressed or in field or frame format. Similarly, the digital video may be in any one of a number of color space representations including RGB and YUV. The processor performs the operation as described with respect to the flow charts of FIGS. 1A and 1B for demultiplexing the digital video. It should be understood that within this disclosure the term frame will be used to refer to a video image which is to be displayed for a designated time period. The disclosure is equally applicable to video fields which are normally produced for display devices displaying interlaced images.

Figure 1A:
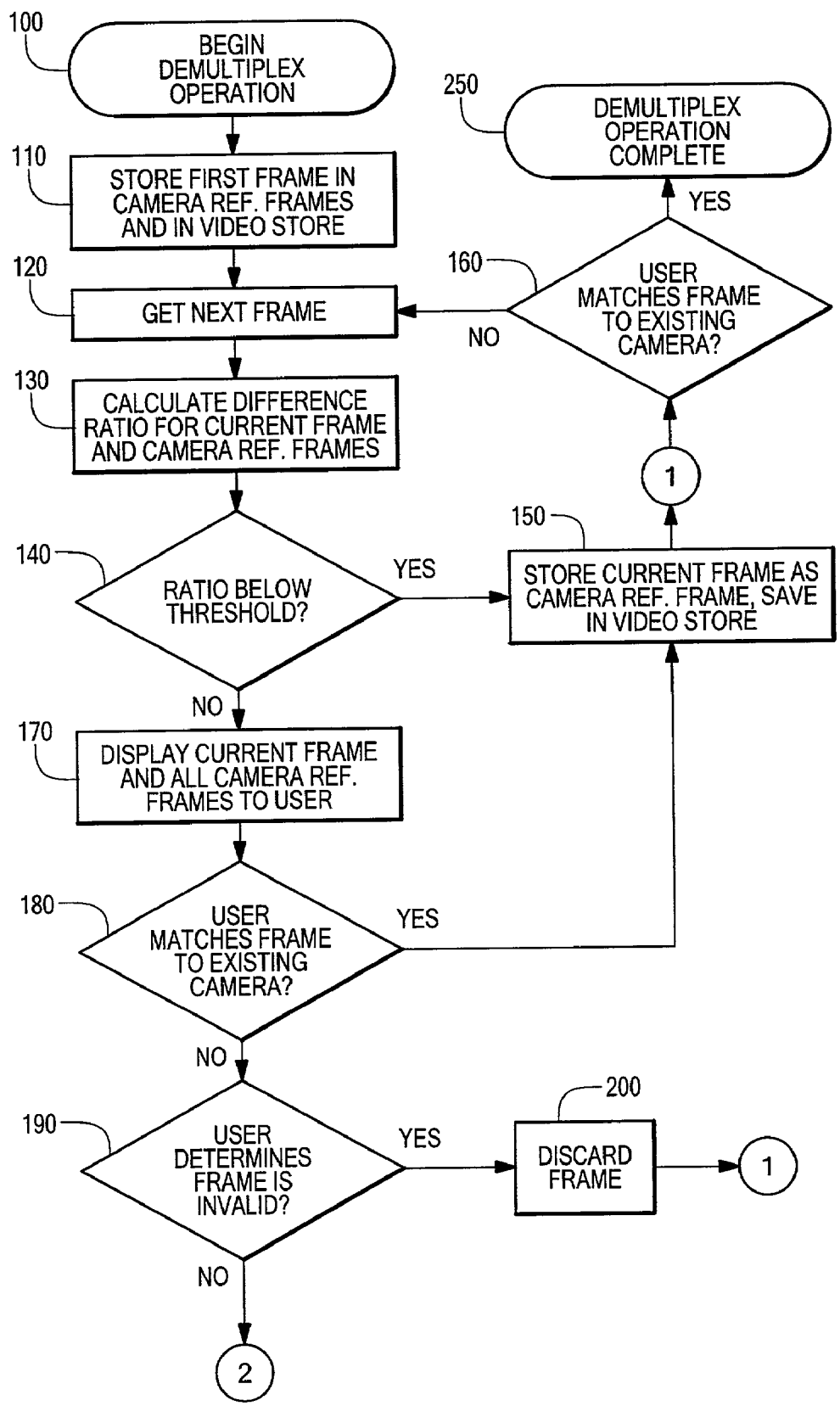
FIG. 1A is a flow diagram illustrating demultiplexing video frames from a plurality of cameras in a stream of video image frames.
Figure 1B:
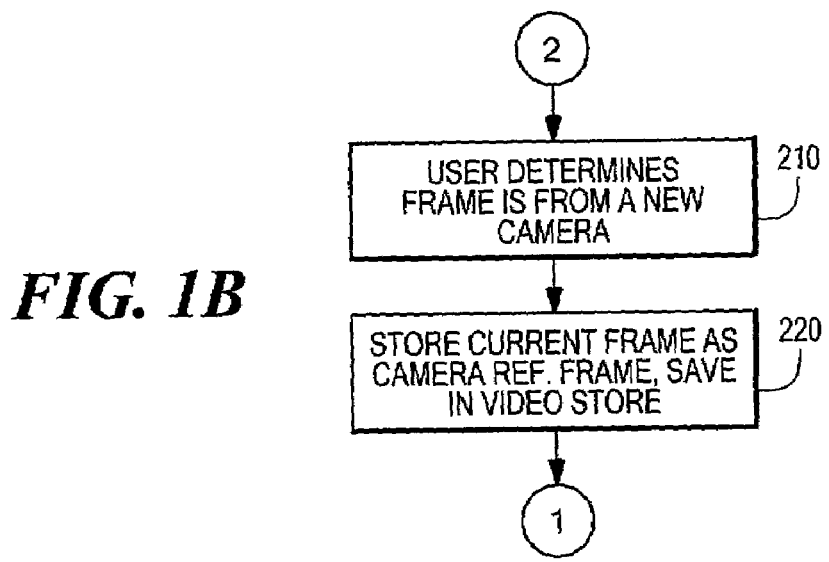
FIG. 1B is a flow diagram illustrating further aspects of demultiplexing video frames.

As shown in FIGS. 1A and 1B, the operation of demultiplexing video from a plurality of sources 100. The first video frame in the digital video is parsed and stored in a memory location 110. The frame by default is marked as a reference frame for a first source, which in this embodiment is camera 1. A reference frame designates the frame to which the current frame is to be compared. In one embodiment, the frame which may be an NTSC frame is reduced in size prior to comparison, for example to ⅛ of the original size prior to storage. Reduction of the frame size may be simply achieved by removing pixels. For example, to reduce the number of pixels by a factor of 4 for an 800×600 pixel image, every other pixel could be removed such that there were 400×300 pixels. In another embodiment, the data may be reduced through averaging. For example, every eight rows of eight pixels could be averaged such that 64 pixels are reduced to one pixel. The next frame ("the current frame") is then parsed from the digital video 120.

A user selected area is then chosen for the reference frame. This selected area is used for comparing the selected area of the reference frame and the same selected area of the current frame. In certain embodiments, the selected area will default to the entire frame and require no interaction from the user of the system. Prior to comparison of the reference and current frames, the selected area of the frames are normalized so as to remove any change in brightness/ intensity from the comparison. For example, the average intensity value for the pixels in the user selected area in the reference frame and the same area in the current frame are calculated. Each pixel intensity value is then divided by the average intensity vale for the respective user defined area. This step normalizes the values accounting for any changes in brightness, such as sudden flashes of light. For example, if a camera is monitoring an automated teller machine and a car approaches the machine in which the headlights of the car suddenly illuminate the viewing area, this lighting change will be accounted for. This normalization may also be performed in any one of a number of ways known in the art including using the RMS value as opposed to the average intensity for the user selected area.

Figure 2A:
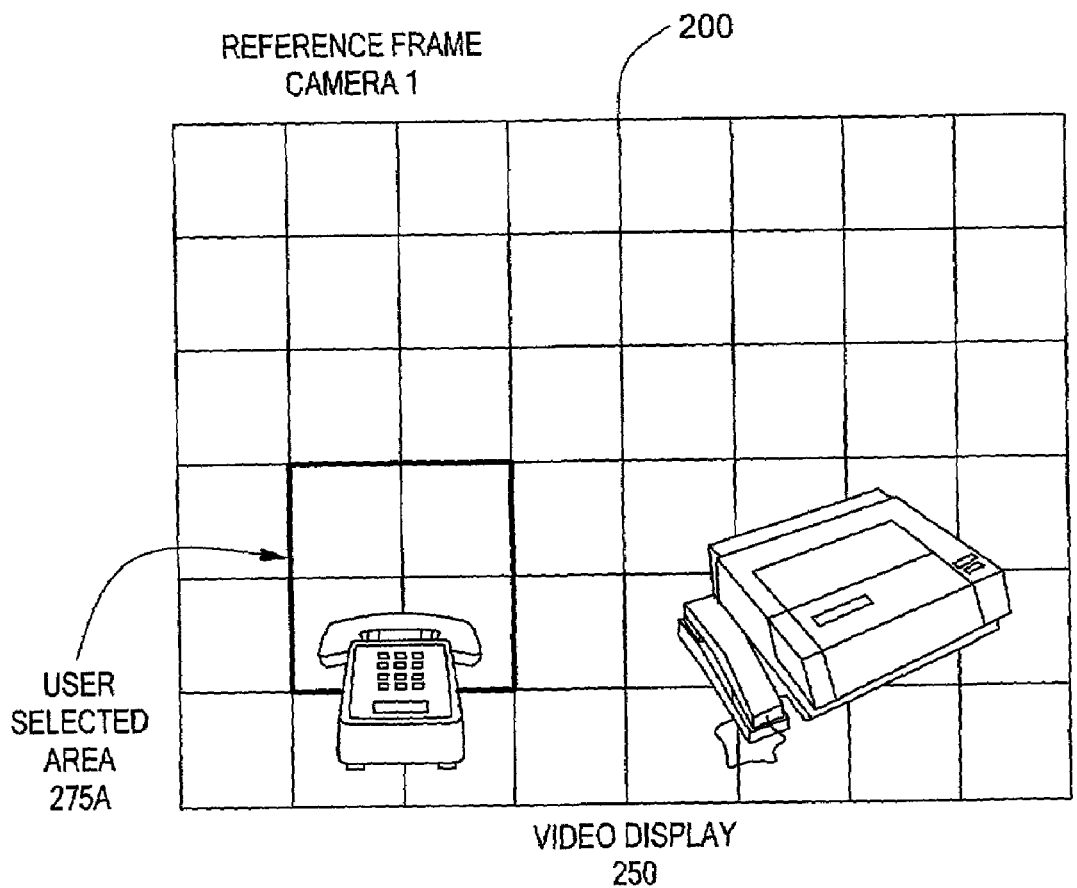
FIG. 2A represents a reference frame as displayed on a display device and the lined box indicates the user defined area.
Figure 2B:
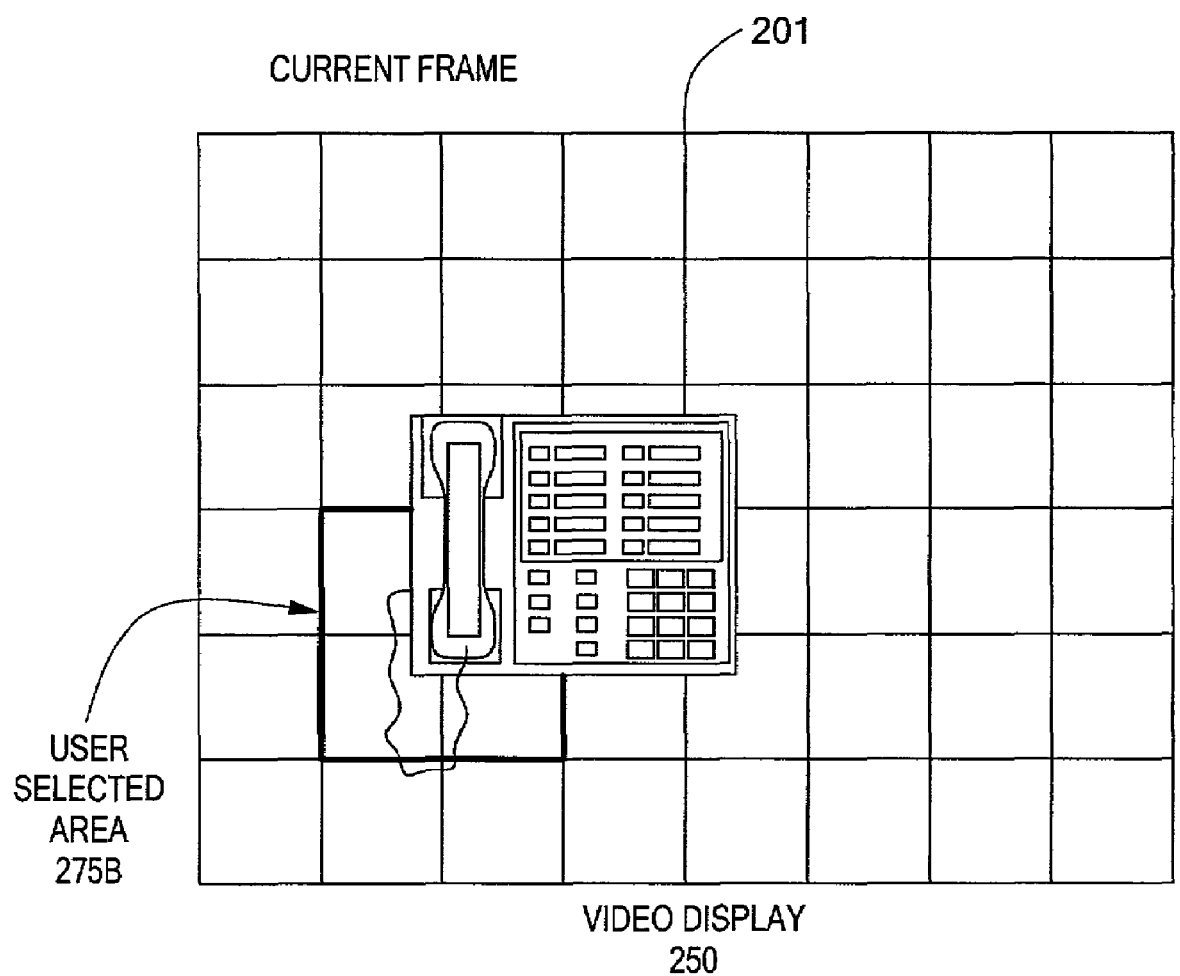
FIG. 2B represents the current frame as displayed on a display device and shows that the same user defined area as that in FIG. 2A is used for comparison.

Based on the user selected area, the current frame is then compared 130 with the same area of the reference frame. For example, see FIGS. 2A and 2B wherein FIG. 2A represents the reference frame 200 as displayed on a display device 250 and the lined box indicates the user defined area 275A. FIG. 2B represents the current frame 201 as displayed on a display device 250 and shows that the same user defined area 275B of the display screen as that in FIG. 2A is used for comparison. In the embodiment in which the reference frame is reduced in size prior to storage, the current frame is reduced in size prior to comparison. By reducing the size of the video frames, the storage space is reduced and the average error rate is decreased thereby reducing jitter.

Difference ratios are calculated 130 between the current frame and each reference frame of an identified source (camera). The sum of the absolute value of the difference between the current frame's pixels and the reference frame's pixels in the user selected area is calculated and then divided by the sum of the intensity values of the current frame's pixels in the user selected area. This ratio represents the difference between the current frame and a given camera reference frame. Through the first iteration, since there is only one source identified, the difference ratio is calculated only for the representative frame from camera 1. The lowest difference ratio is compared to a user defined threshold value. If the lowest difference ratio is below a user defined threshold value 140, the current frame is identified as coming from the source associated with the lowest difference ratio. In one embodiment of the invention, the current frame that is identified with a source is then copied to the corresponding camera reference frame and the frame is written 150 to memory. The process of replacing the reference frame with the current frame assists in source identification, since the effect of changes which gradually occur, such as lighting changes between day and night and camera panning are minimized.

If the lowest difference ratio is equal to or above the user defined threshold value, the user is prompted to identify the frame. The current frame and the latest reference frame of each camera are displayed on a display device to the user 170, so that the user can visually compare the frames. The current frame may be a frame from a new source or a frame from a source that has been identified already or invalid data to be skipped.

If the user identifies the frame as a frame from a new source 210, i.e., a camera that has not yet been identified, then the frame is copied as a new source reference frame, and the frame is written to memory as the first frame of the new camera. If the user identifies the frame as a match to an existing source 180, then the frame is copied to the corresponding source reference frame, and then output 150 as the corresponding source. If the user identifies the frame as invalid data to be skipped 190, the frame is discarded 200 and processing proceeds. The process is repeated 160 until all frames are processed and the demultiplex operation is complete 250. It should be noted that after each camera is identified and a reference frame is associated with the camera source, comparisons will be performed between the current frame and each source's reference frame.

In the surveillance industry, multiplexed video is multiplexed such that a frame or multiple frames from each camera are stored in a sequential manner (camera 1, camera 2, etc.). As a result, after processing the first few frames, all of the cameras are normally identified. The user is then only prompted when a frame does not match any existing source. A non-match can be due to noise or damage to the video frame and the data can be skipped, or a source can be identified which stores all damaged or noisy frames. A non-match can also occur when a significant change occurs in the frame, such as a large object moving through the selected area.

In a specific embodiment of the present invention, the user can change the threshold. For example, raising the threshold may be advantageous if unnecessary prompting occurs when images from a common source are not properly identified. In such an embodiment, the current threshold along with the current difference ratios are displayed to the user on a display device and the user can either select one of a plurality of predetermined thresholds or the user may manually input a threshold.

In another embodiment, there are two separate thresholds that are used for comparison to the difference ratios. The first threshold as described above is used to determine if the current image matches any of the cameras. The second threshold provides a level above which frames should be discarded. If the second threshold is exceeded, the data associated with the image is automatically discarded. The second threshold has a value which is greater than the first threshold and can be determined through historical analysis or experimentation.

In one embodiment of the invention, video from cameras 300, 301, 302 that film an area by sweeping across the area are de-multiplexed as shown in FIG. 3. In this embodiment, when the threshold is set for associating an image with a camera, the temporal change from image to image as the camera sweeps is taken into account. For example, FIG. 3 shows three cameras (camera 1, camera 2, and camera 3) producing a sequence of multiplexed video frames 320 in which an image from each camera is added to the sequence over time. After a frame from all three cameras has been saved to the sequence, the process repeats. In FIG. 3A images from camera 1 occur at T0 and T3. As shown in FIG. 3B if the image from T0 is shifted by three pixels which accounts for the movement of the camera between T0 and T3 and the images are overlaid the majority of the pixels from the image at T0 will overlap with the image at T3. By replacing the reference frame with the current frame and using the updated reference frame during comparison, the amount of movement between the reference frame and the current frame is minimized such that more elaborate tracking and comparison techniques need not be employed. If the movement of the camera is slow in comparison to the time between saved images, the threshold can be adjusted to accommodate movement.

In other embodiments, the pixels of the reference frame are shifted in position prior to comparison with the current frame to account for the sweep of the camera. Additionally, in the comparison process, the current image can be shifted several times in several directions for calculating a difference ratio and comparing the ratio to the threshold. Further, the direction of movement can be anticipated through trend analysis wherein the direction of movement is based upon previous movement for the same source. Thus, by tracking the direction of movement, the number of shifts of the data locations and comparisons are reduced.

In a further specific embodiment, threshold is set for an individual camera so that motion or changes in the frame taking place in the view of the camera are identified, such that only those frames are saved in the video image storage area. In such an embodiment, the same method of comparison occurs, but the current frame and reference frames are only held in volatile memory and the frames that exceed the threshold are stored to non-volatile memory associated with the system. In another variation, once the threshold is exceeded, the user of the system is shown the image that exceeded the threshold and prompted on a display device to indicate whether the frame should be stored to non-volatile memory.

Under certain circumstances, the video frames may be separated by time and/or date. In certain multiplexing systems in which cameras are digital cameras such as those that include CCD (charged-coupled devices), the digital data stream containing the digital frames may include a date and time stamp preceding the digital video frame. In such a case, the frames can be stored and separated out according to date and time. In other multiplexing systems, in which the cameras produce an analog signal with a superimposed date and time or in which digital cameras include date and time within the digital frame, the video frames may be subdivided out by time and date. In this embodiment, after the video signal is digitized, the user selected region of interest is selected as the displayed time or date. If the video frames are to be separated out by time, the user selected region could be selected to be the hour 400A as shown in FIG. 4A and any time there is a change in that area of the video frame the data of the video frame could be saved to a different memory location which is associated with that hour. Similarly in FIG. 4B a video display 410 of digital image data is shown in which the day of the month is the selected user-defined region 400B. The system can then continuously look for changes in data within the selected user-defined area that are above a threshold in order to identify frames that come from different days of the month.

Figure 5:
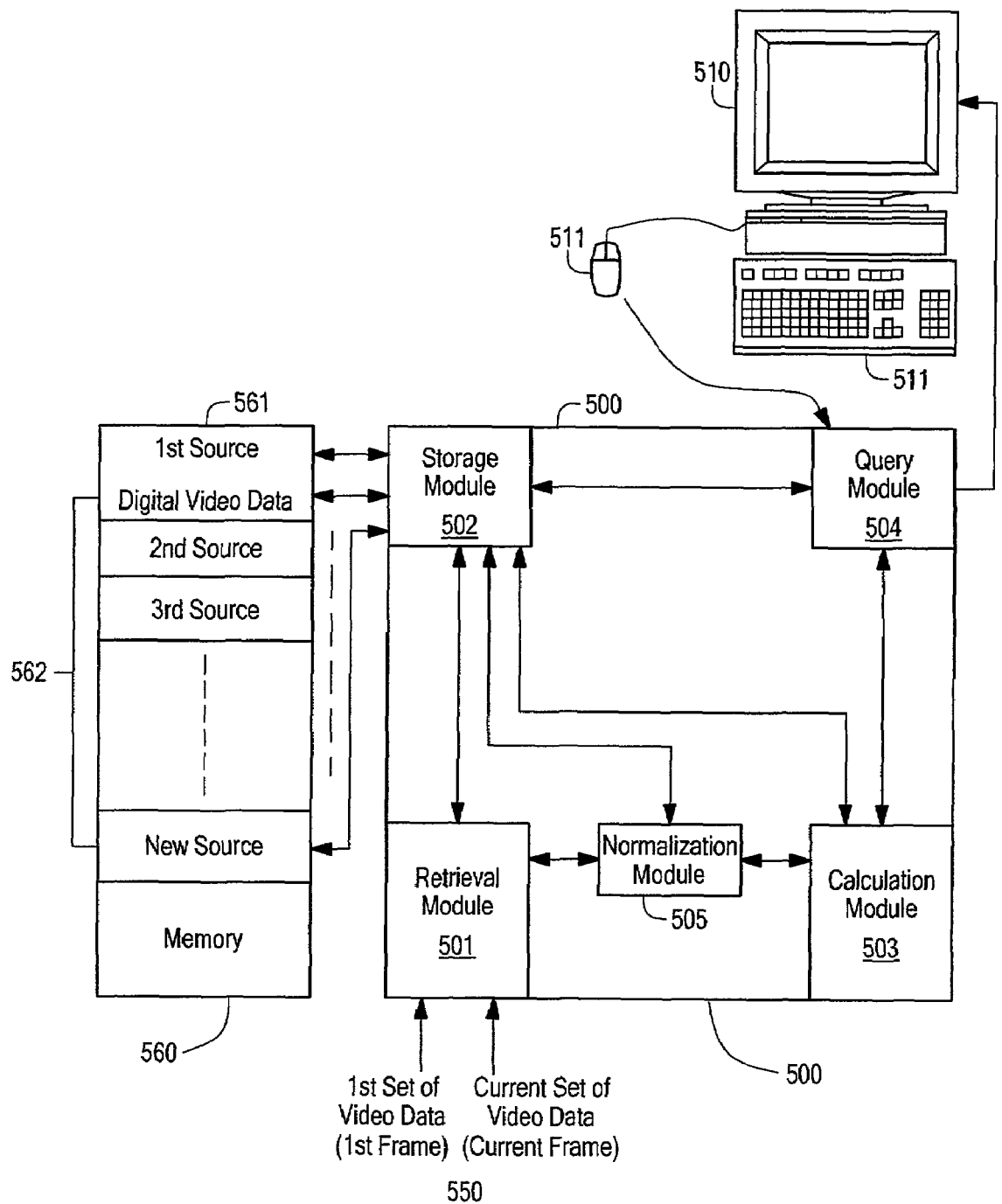
FIG. 5 is an embodiment of the invention in which modules are constructed in hardware to perform the functions of the disclosed method.

FIG. 5 is another embodiment of the invention in which the invention is in a device form 500. The device 500 may be an electronic device such as a programmed FPGA module or an ASIC chip. The device 500 includes a retrieval module 501 which retrieves or receives digital image data 550. The digital image data includes frames of video data from multiple sources. The retrieval module 501 retrieves a first set of digital video data representative of a first image and also retrieves a current set of digital video data representative of a current image. The retrieval module 501 passes the first set of digital data to a storage module 502. The storage module 502 stores to memory 560 the first set of digital video data to a memory location associated with a first source 561. The data is also identified as the representative video data of the first source. The retrieval module 501 passes the first set of digital video data to a calculation module 503 along with the current set of digital video data. The calculation module 503 calculates a difference ratio using the first set of digital video data and the current set of digital video data as explained above. If more than one source has already been identified, the digital video data of each representative frame for a source is retrieved and a difference ratio is calculated for each. The difference ratio(s) are forwarded to a query module 504. The query module 504 compares the difference ratio(s) to a threshold. If a difference ratio for a representative frame of a source is below the threshold then the current frame is associated with that source.

The digital video data is then stored in memory associated with the identified source 562. For example if the difference ratio for the representative frame of the $4^{th}$ source is below the threshold, the current digital video data will be associated with that source. Further, the current frame will become the representative frame of the $4^{th}$ source.

If all of the difference ratios are above the threshold the query module 504 produces a display query on a display device 510 requiring a response from a user of the device for classifying the current digital video data as belonging to an identified source or originating from a new source. In such a manner, a user receives a message on the display device 510 that the current frame of video data cannot readily be associated with a particular source since the difference ratio is above a threshold. The user can then send a response through an input device 511, such as a keyboard or a mouse which is connectively coupled to the device which indicates that the current frame is either from the first source or other previously identified source, should be associated with a new source or should be discarded. The query module 504 receives this information and instructs the storage module 502 to store the current digital video data for the current frame of video in a memory location with the identified source. The user of the system is provided with a display of the current image, as well as, each representative frame for a source. This allows the user to make a visual comparison aiding in the identification process.

It should be understood that if the user identifies the current digital video data as coming from a new source the current digital video data will be associated with a memory location associated with a new source. A normalization module 505 may also be included in the device. The normalization module normalizes the digital video data of the current video frame as compared to the representative video frames. As expressed above, normalization of the digital video data can account for changes in lighting such as the changes that occur from day to night. Normalization occurs prior to the calculation of the difference ratio.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.) The present invention may be embodied in other specific forms without departing from the true scope of the invention. The described embodiments are to be considered in all respects only as illustrative and not restrictive.

We claim:

1. A method for demultiplexing digital video data which originates from multiple sources, the method comprising:
   retrieving from a storage medium a first set of digital video data representative of a first image;
   storing the first set of digital video data to a memory location associated with a first source such that the first set of digital video data is representative digital video data of the first source;
   retrieving a current set of digital video data representative of a current image;
   calculating in a processor a difference ratio using the representative digital video data and the current set of digital video data; and
   if the difference ratio is above a threshold, outputting a display query viewable on a display device requiring response for classifying the current digital video data as belonging to an identified source or originating from a new source, wherein the first source is an identified source.

2. The method according to claim 1 further comprising: storing the current set of digital video data to a second memory location associated with the second source in accordance with a received response indicating that the current set of digital video data is associated with a new source such that the current set of digital video data is representative digital video data of the second source.

3. The method according to claim 1, further comprising:
   if the difference ratio is below the threshold, storing the current digital video data to the memory location associated with the first source such that the current digital video data set is representative digital video data for the first source.

4. The method according to claim 1, further comprising:
   normalizing the digital video data to compensate for differences in brightness prior to calculating a difference ratio.

5. The method according to claim 1, wherein the steps of calculating and producing further comprises:
   calculating a difference ratio for each representative digital video data set from a source and the current set of digital video data; and
   comparing each difference ratio to the threshold.

6. The method according to claim 5, further comprising identifying a source for which the difference ratio is below the threshold; and
   associating the current set of digital video data with the identified source.

7. The method according to claim, 1 wherein associating the current set of digital video data with the identified source further comprises:
   identifying the current set of digital video data as a representative digital video data set for a source.

8. The method according to claim 1 wherein the first set of digital video data is reduced in data size prior to being stored; and
   wherein a representation of the current set of digital video data is created which has a reduced size and which is used for determining the difference ratio.

9. The method according to claim 1, further comprising:
   receiving a signal containing information representative of a section of the image to use for comparison in calculating the difference ratio, wherein the same section of the current frame and the same section of each representative frame are used in calculating the difference ratio.

10. The method according to claim 1, further comprising:
    if the difference ratio is below the threshold, identifying the current frame as a representative frame of a source, wherein the set of data for the representative frame is used for comparisons with a set of data for subsequent frames.

11. The method according to claim 1, wherein as each different originating source is identified, the set of data that is representative of the current frame is stored as the representative frame for that source.

12. The method according to claim 1, wherein the sources are stationary surveillance cameras.

13. The method according to claim 1, wherein the sources are rotating surveillance cameras.

14. A method for demultiplexing digital video data which originates from multiple sources, the method comprising:
    retrieving a first set of digital video data representative of an image;
    storing the first set of digital video data to a memory location associated with a first source such that the first set of digital video is representative digital video of the first source;
    retrieving a current set of digital video data representative of an image;
    selecting a subset of the first set of digital video data;
    selecting a subset of the current set of digital video data such that the subset of the first set and the subset of the current set contain identical pixel locations;

calculating in a processor a difference measurement between the subset of the first set and the subset of the current set;

calculating a difference ratio based upon the difference measurement; and if the difference ratio is above a threshold, outputting a display query displayable on a display device requiring response for classifying the digital video data as belonging to an identified source or originating from a new source.

15. The method according to claim 14 further comprising: storing the current set of digital video data to a second memory location associated with the second source in accordance with a received response indicating that the current set of digital video data is associated with a new source such that the current set of digital video data is representative digital video data of the new source.

16. The method according to claim 14, further comprising:

if the difference ratio is below the threshold, storing the current digital video data to the memory location associated with the first source such that the current digital video data set is representative digital video data for the first source.

17. The method according to claim 14, further comprising:

normalizing the current digital video data to compensate for differences in brightness prior to calculating a difference ratio.

18. The method according to claim 14, wherein the steps of calculating and producing further comprises:

calculating a difference ratio for each representative digital video data set from a source and the current set of digital video data; and comparing each difference ratio to the threshold.

19. The method according to claim 18, further comprising identifying a source for which the difference ratio is below the threshold; and associating the current set of digital video data with the identified source.

20. The method according to claim, 14 wherein associating the current set of digital video data with the identified source further comprises:

identifying the current set of digital video data as a representative digital video data set for a source.

21. The method according to claim 14 wherein the first set of digital video data is reduced in data size prior to being stored; and wherein a representation of the current set of digital video data is created which has a reduced size and which is used for determining the difference ratio.

22. The method according to claim 14, farther comprising:

if the difference ratio is below the threshold, identifying the current frame as a representative frame of a source, wherein the set of data for the representative frame is used for comparisons with a set of data for subsequent frames.

23. The method according to claim 14, wherein as each different originating source is identified, the set of data that is representative of the current frame is stored as the representative frame for that source.

24. The method according to claim 14, wherein the sources are stationary surveillance cameras.

25. The method according to claim 14, wherein the sources are rotating surveillance cameras.

26. The method according to claim 1, further comprising:

receiving a signal containing information representative of a threshold.

27. The method according to claim 14, further comprising:

receiving a signal containing information representative of a threshold.

28. A computer program product comprising a tangible computer readable storage medium storing a computer program having computer readable code executable by a computer for demultiplexing digital video data which originates from multiple sources, the computer program comprising:

computer code for retrieving a first set of digital video data representative of a first image;

computer code for storing the first set of digital video data to a memory location associated with a first source;

computer code for retrieving a current set of digital video data representative of a current image;

computer code for calculating a difference ratio using the first set of digital video data and the current set of digital video data; and computer code for producing a display query requiring response for classifying the digital video data as belonging to an identified source or originating from a new source if the difference ratio is above a threshold, wherein the first source is an identified source.

29. The computer program product according to claim 28 further comprising:

computer code for storing the current set of digital video data to a second memory location associated with the second source in accordance with a received response indicating that the current set of digital video data is associated with a new source.

30. The computer program product according to claim 28, further comprising:

computer code for storing the current digital video data to the memory location associated with the first source if the difference ratio is below the threshold.

31. The computer program product according to claim 28, further comprising:

computer code for normalizing the digital video data to compensate for differences in brightness prior to calculating a difference ratio.

32. The computer program product according to claim 28, wherein the computer code for calculating and producing further comprises:

computer code for calculating a difference ratio for each representative digital video data set from a source and the current set of digital video data; and computer code for comparing each difference ratio to the threshold.

33. The computer program product according to claim 32, further comprising:

computer code for identifying a source for which the difference ratio is below the threshold; and computer code for associating the current set of digital video data with the identified source.

34. The computer program product according to claim, 28 wherein the computer code for associating the current set of digital video data with the identified source further comprises computer code for identifying the current set of digital video data as a representative digital video data set for a source.

35. The computer program product according to claim 28 further comprising computer code for reducing the first set of digital video data in data size prior to being stored; and computer code for reducing the current set of digital video data in data size prior to using the current set of digital data for determining the difference ratio.

36. The computer program product according to claim 28, further comprising:
computer code for receiving a signal containing information representative of a section of the image to use for comparison in calculating the difference ratio, wherein the same section of the current frame and the same section of each representative frame are used in calculating the difference ratio.

37. The computer program product according to claim 28, further comprising:
computer code for identifying the current frame as a representative frame of a source if the difference ratio is below the threshold, wherein the set of data for the representative frame is used for comparisons with a set of data for subsequent frames.

38. The computer program product according to claim 28, wherein as each different originating source is identified, the set of data that is representative of the current frame is stored as the representative frame for that source by the computer code for identifying.

39. A computer program product comprising a tangible computer readable storage medium storing a computer program having computer readable code executable by a computer for demultiplexing digital video data which originates from multiple sources, the computer program comprising:
computer code for retrieving a first set of digital video data representative of an image;
computer code for storing the first set of digital video data to a memory location associated with a first source such that the first set of digital video is representative digital video of the first source;
computer code for retrieving a current set of digital video data representative of an image;
computer code for selecting a subset of the first set of digital video data;
computer code for selecting a subset of the current set of digital video data such that the subset of the first set and the subset of the current set contain identical pixel locations;
computer code for calculating a difference measurement between the subset of the first set and the subset of the current set;
computer code for calculating a difference ratio based upon the difference measurement; and
computer code for producing a display query requiring response for classifying the digital video data as belonging to an identified source or originating from a new source if the difference ratio is above a threshold.

40. The computer program product according to claim 39 further comprising:
computer code for storing the current set of digital video data to a second memory location associated with the second source in accordance with a received response indicating that the current set of digital video data is associated with a new source such that the current set of digital video data is representative digital video data of the new source.

41. The computer program product according to claim 39, further comprising:
computer code for storing the current digital video data to the memory location associated with the first source such that the current digital video data set is representative digital video data for the first source if the difference ratio is below the threshold.

42. The computer program product according to claim 39, further comprising:
computer code for normalizing the current digital video data to compensate for differences in brightness prior to calculating a difference ratio.

43. The computer program product according to claim 39, wherein the computer code for calculating includes:
computer code for calculating a difference ratio for each representative digital video data set from a source and the current set of digital video data; and
wherein the computer code for producing includes computer code for comparing each difference ratio to the threshold.

44. The computer program product according to claim 43, further comprising computer code for identifying a source for which the difference ratio is below the threshold; and
computer code for associating the current set of digital video data with the identified source.

45. The computer program product according to claim, 39 wherein the computer code for associating the current set of digital video data with the identified source further comprises:
computer code for identifying the current set of digital video data as a representative digital video data set for a source.

46. The computer program product according to claim 39 further comprising computer code for creating a representation of the first set of digital video data that is reduced in data size; and
Computer code for creating a representation of the current set of digital video data which has a reduced size; wherein the reduced first set of digital video data and the reduced current set of digital video data are used for determining the difference ratio.

47. The computer program product according to claim 39, further comprising:
computer code for identifying the current frame as a representative frame of a source if the difference ratio is below the threshold, wherein the set of data for the representative frame is used for comparisons with a set of data for subsequent frames.

48. The computer program product according to claim 39, further comprising computer code for storing the set of data that is representative of the current frame is stored as the representative frame for that source as each different originating source is identified by the computer code for producing.

49. A device for demultiplexing digital video data which originates from multiple sources, the device comprising:
a retrieval module for retrieving a first set of digital video data representative of a first image and retrieving a current set of digital video data representative of a current image;
a storage module for storing the first set of digital video data to a memory location associated with a first source;
a calculation module for calculating a difference ratio using the first set of digital video data and the current set of digital video data; and
a query module for producing a display query requiring response for classifying the digital video data as belonging to an identified source or originating from a new source if the difference ratio is above a threshold, wherein the first source is an identified source.

50. The device according to claim 49 wherein the storage module stores the current set of digital video data to a second memory location associated with the second source in accordance with a received response indicating that the current set of digital video data is associated with a new source.

51. The device according to claim 49, wherein the storage module stores the current digital video data to the memory location associated with the first source if the difference ratio is below the threshold.

52. The device according to claim 49, further comprising:
a normalization module for normalizing the digital video data to compensate for differences in brightness prior to providing the digital video data to the calculation module for calculating a difference ratio.

53. The device according to claim 49, wherein the calculation module calculates a difference ratio for each representative digital video data set representative of a source and the current set of digital video data; and
wherein the query module compares each difference ratio to the threshold.

54. The device according to claim 49, wherein the query module identifies a source for which the difference ratio is below the threshold; and
wherein the memory module associates the current set of digital video data with the identified source.

* * * * *